Figure 1:
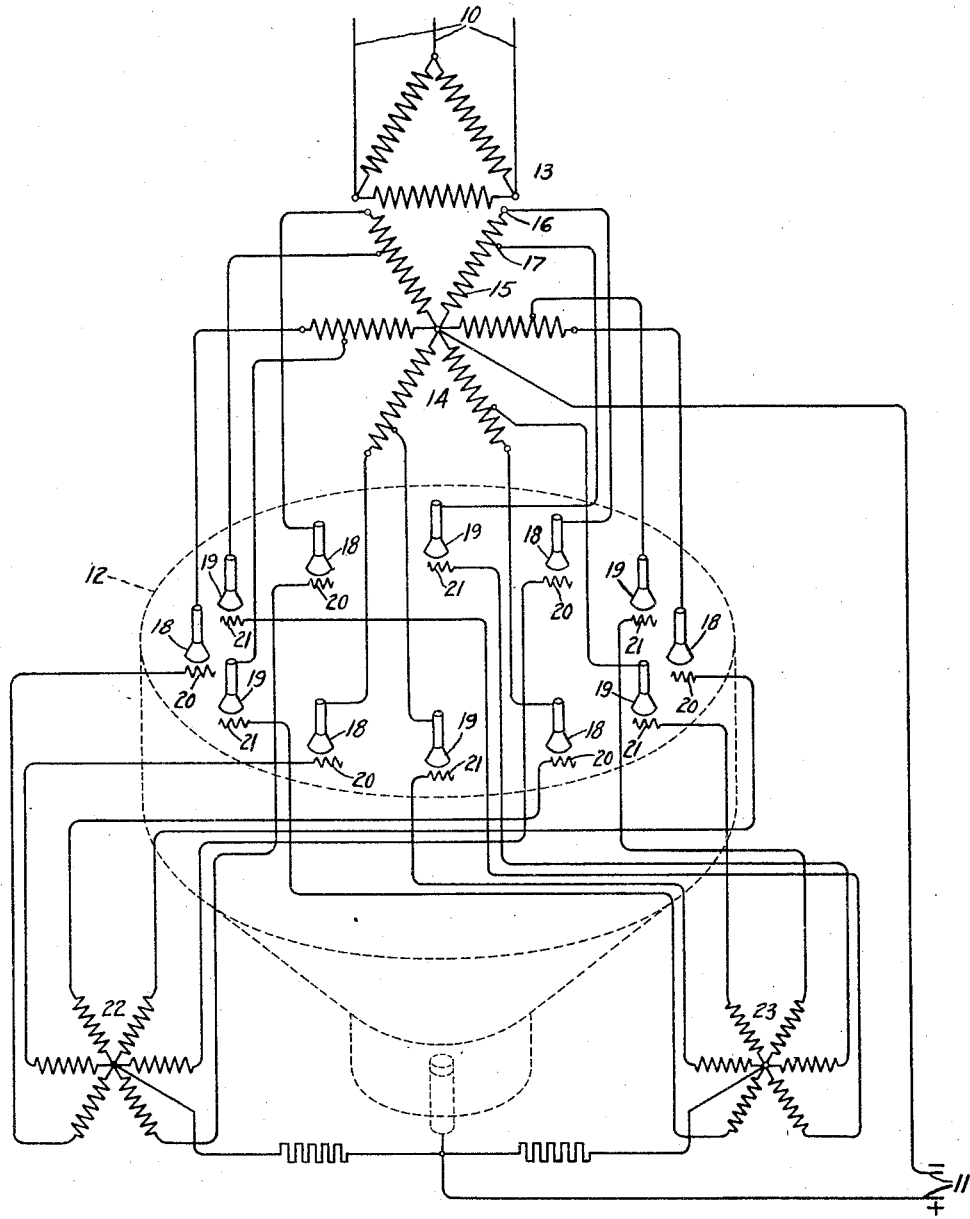

Jan. 10, 1933.   D. C. PRINCE   1,893,784
VOLTAGE REGULATING SYSTEM
Filed Sept. 26, 1930   2 Sheets-Sheet 1

Inventor:
David C. Prince,
by Charles V. Mulla
His Attorney.

Patented Jan. 10, 1933

1,893,784

UNITED STATES PATENT OFFICE

DAVID C. PRINCE, OF SCHENECTADY, NEW YORK, ASSIGNOR TO GENERAL ELECTRIC COMPANY, A CORPORATION OF NEW YORK

VOLTAGE REGULATING SYSTEM

Application filed September 26, 1930. Serial No. 484,692.

My invention relates to systems including an electric valve for transferring power between a supply circuit and a load circuit at least one of which circuits being an alternating current circuit.

In the transfer of power between alternating and direct current circuits or between two alternating current circuits, it often becomes desirable to control the voltage of the load circuit over a wide range even though the voltage of the supply circuit remains constant. The use of discontinuous control electric valves, such, for example, as valves of the vapor electric discharge type, has been found particularly advantageous in such power transfer systems because of the relatively large amount of power that may be handled at ordinary operating voltages. By the term discontinuous control electric valve, I refer to that type of valve provided with an anode, a cathode, and a control electrode in which the starting of the current in a valve is determined by the potential on its control grid but in which the current flowing through the valve may be interrupted only by reducing its anode potential below the critical value. Heretofore, it has been proposed to control the voltage of a direct current circuit energized from an alternating current circuit through a power transfer system including an electric valve of the discontinuous control type by shifting the phase of the grid potential of the electric valve with respect to its anode potential and thus delay the point in each half cycle of positive anode potential at which the valve is made conducting. However, this method of voltage control has been found to involve the disadvantage that, for any phase angle of the voltage impressed upon the control electrodes materially different from that which gives the maximum ratio of direct to alternating voltage in the system, the power factor departs from unity to a large extent; that is, if the direct voltage be reduced to zero the power factor also is automatically reduced to zero. Furthermore, such a method of voltage control, while particularly suitable to a rectifying system has been found not to be of general application.

It is an object of my invention, therefore, to provide an improved system for transferring power between a supply circuit and a load circuit, one of which is an alternating current circuit, including an electric valve in which the voltage of the load circuit may be controlled over a wide range without lowering the power factor of the alternating current circuit to an objectionable value.

It is a further object of my invention to provide an improved system for transferring power between a supply and a load circuit, one of which is an alternating current circuit, which is of general application and is not limited to the specific arrangement of transferring power from an alternating current system to a direct current circuit.

In accordance with my invention the alternating current circuit of the transfer system is supplied with a plurality of electrically spaced terminals and an electric valve associated with each terminal. In order to obtain one range of ratios between the voltage of the two circuits, the valve associated with a terminal of higher potential is maintained non-conducting while the potential of the control electrode of a valve associated with a terminal of lower potential is shifted in phase with respect to its anode potential to secure the desired voltage control. After the maximum ratio of voltages obtainable from this terminal is reached, this valve is maintained conducting and the potential of the control electrode of the valve associated with the terminal of next higher potential is gradually advanced from 180 degrees lagging. In case the alternating current system is provided with a greater number of terminals of different potential, this procedure is successively repeated for the several electric valves associated with the electrically spaced terminals.

My invention will be better understood from the following description when considered in connection with the accompanying drawing and its scope will be pointed out in the appended claims.

Figure 2:
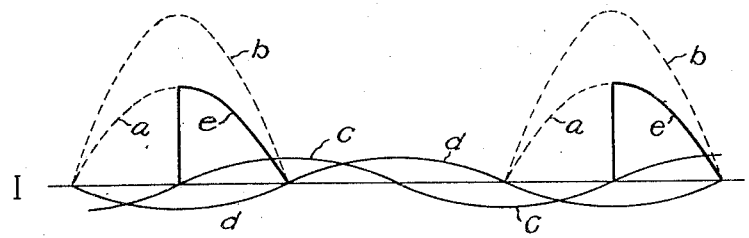
Figure 2:
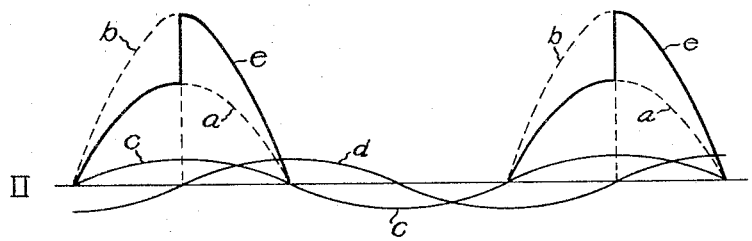
Figure 2:
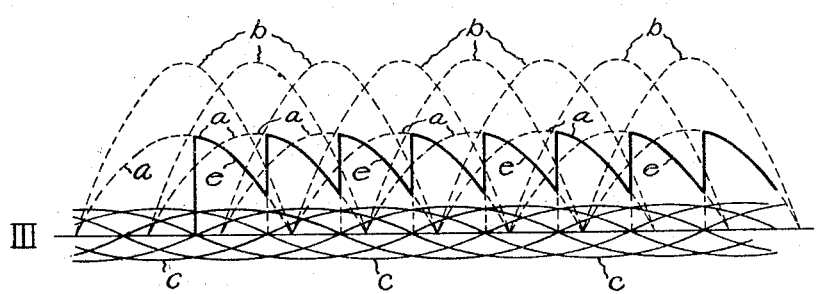
Figure 2:
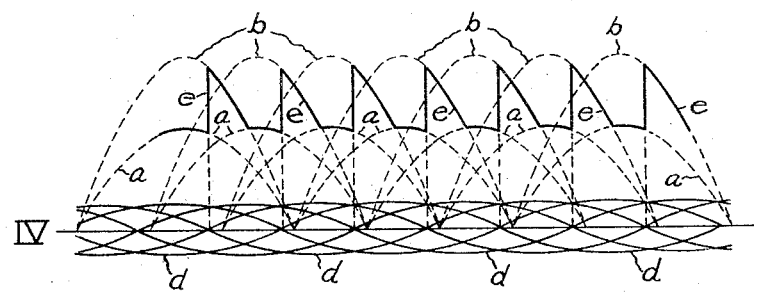

Referring to the drawings, Fig. 1 thereof shows diagrammatically a system for transferring power between direct and alternating current circuits, wherein my invention has been embodied while the diagrams of Fig. 2 represent certain operating characteristics of the apparatus shown in Fig. 1.

In the system shown in the figure, power is transferred between an alternating current circuit 10 and a direct current circuit 11 by a vapor electric device 12, which may be a rectifier or an inverter, connected to the circuit 10 through a transformer 13 having a secondary 14, which in the present embodiment of the invention is shown as the star-connected secondary of a six-phase transformer. In accordance with my invention each phase winding 15 of the secondary 14 is provided with two sets of taps 16, 17, and the vapor electric device 12 is provided with two groups of anodes 18, 19, the anodes of group 18 being connected respectively to taps 16 and the anodes of group 19 to taps 17. Further in accordance with the invention, the control electrodes or grids which determine the starting of current flow from the anodes are divided into two groups 20, 21 associated respectively with the anodes groups 18, 19. It will be readily understood that twelve single-anode vapor electric devices, each device comprising one of the anodes 18, 19 and the control electrode associated therewith, may be used in place of the multiple-anode device 12 shown in the drawing and by the term "electric valve" as used in the following specification and claims, I refer to either a single anode valve or a single path in a multiple anode valve. In order that the starting of current flow in each of the anode groups 18 and 19 may be determined independently, the control electrode groups 20 and 21 are arranged to be connected each to a different one of separate well known devices for impressing potentials on these groups of electrodes and for shifting the phase of the potential, such, for example, as devices similar to the wound rotor induction motor, comprising secondary windings 22, 23.

Assuming that the above described system is operating as a rectifier, the voltage of the direct current circuit 11 is controlled up to the maximum obtainable from the taps 17 of the secondary winding 14 of the transformer 13, that is, the minimum ratio of alternating to direct voltage for this tap, by maintaining the potentials applied to the control electrodes associated with the group of anodes 18 out of phase with respect to the potentials of these anodes and by gradually advancing the phase of the potentials of the control electrodes 21 associated with the group of anodes 19. Voltages above this value up to the maximum obtainable from the tap 16, that is, the minimum ratio of alternating to direct voltage for this tap, are obtained by maintaining the potentials of the group of electrodes 21 associated with a group of anodes 19 in phase with the potentials of these anodes and gradually advancing the phase of the potentials applied to the control electrodes 20 associated with the group of anodes 18. The operation of the above described system can be more easily explained by considering the conditions obtaining in a single phase winding 15 of the secondary winding 14 and its associated electric valve, for the time being neglecting the other phase windings. Such an arrangement is, of course, equivalent to a single phase system. These conditions are illustrated in diagrams I and II of Fig. 2 in which curve $a$ represents the voltage of the transformer tap 17 while curve $b$ represents that of the tap 16. Curve $c$ represents the potential of the control electrode 21 associated with the anode 19 connected to the tap 17, while the curve $d$ represents the potential applied to the control electrode 20 associated with the anode 18 connected to the transformer tap 16. Diagram I illustrates the manner in which voltages varying from zero up to the maximum voltage of the tap 17 may be obtained. In this diagram it is seen that the grid potential of the control electrode associated with the anode of higher potential is out of phase with its anode potential so that this anode is completely non-conducting. The potential represented by the curve $c$, however, applied to the control electrode 21 may be varied in phase between zero and 180 degrees lagging in order to control the voltage of the load circuit 10. As shown in diagram I, the potential of the control electrode 21 lags its respective anode potential by 90 degrees so that the voltage of the load circuit 11 is substantially half the maximum obtainable from the tap 17, assuming unity power factor. This voltage is represented by the heavy line curve $e$. Diagram II illustrates the manner in which voltages intermediate those supplied by the taps 17 and 16 may be obtained. In this case the potentials applied to the control electrodes 21 are maintained in phase with their respective anode potentials so that this group of valves is at all times conducting. The potentials applied to the control electrodes 20, however, associated with the anodes 18 are varied in phase from zero to 180 degrees lagging with respect to their anode potentials in order to secure the desired control. It is well understood by those skilled in the art that, in case two electric valves, both of which are conducting, are interconnected between a translating circuit and two points of a supply circuit of different potentials, that valve whose anode is connected to the point of higher potential will completely rob the other valve of its current. This can clearly be seen by noting that the portion of the transformer winding 15 between the terminals 16 and 17 is directly short circuited through the valves including the anodes 18 and 19. This portion of the transformer winding tends to send a circulating current through this short circuit path, but due to the unilateral characteristics of electric valve including the anode 19, the result is merely the suppression of current in this valve, that is, the transfer of current from anode 19 to anode 18. This transfer will take place as soon as the potential applied to the control electrode of the anode 18 is made positive. In diagram II this is shown as taking place with a lag of substantially 90 degrees. By varying the phase angle of the potentials applied to the control electrodes 20 of the anodes 18, the average value of the voltage of the circuit 11, which is represented by the heavy curve e, obviously can be controlled over the range of voltage between the maximum voltages obtainable from the taps 17 and 16 respectively.

Diagrams III and IV show the voltage wave forms for the complete six phase circuit described above. In diagram III the potential applied to the control electrodes associated with the group of anodes 18 has been omitted for the sake of simplicity, although, as in diagram I, these potentials will be out of phase with their respective anode potentials. Similarly in diagram IV the potentials applied to the control electrodes 21 associated with the anodes 19 have been omitted for the sake of simplicity, and, as in the diagram II, these potentials will be in phase with their respective anode potentials. The average voltage of the direct current circuit 11 will of course be the average value of the heavy line curve e of diagrams III and IV. The operation of the complete six phase system will be apparent in view of the foregoing detailed explanation of the operation of a single electric valve.

From the above mentioned diagrams it will be observed that in the upper range of voltages the power factor will be higher than it would be if, as in usual practice, the entire load were carried by a single set of anodes, in the present case those of group 18, because any current carried by the other group of anodes 19, is at practically unity power factor.

Obviously additional groups of anodes connected to additional taps might be provided, or switch means might be arranged to connect the groups of anodes to various transformer taps. It will be seen that in the above described manner a continuously variable direct current circuit voltage is obtainable over an indefinite range without any large sacrifice in power factor.

As stated above this apparatus may also be utilized as an inverter, transferring power from the direct current circuit 11 to the alternating current circuit 10. When operated in this way the circuits 10 and 11 will have the same relative potentials for any given phase relation of the potentials applied to the control electrodes. That is, with a constant potential on the circuit 11 the voltage of the circuit 10 will be a maximum, and the ratio of the alternating to the direct voltage will be a minimum when the anodes associated with the taps 17 are conducting current and the voltage of this circuit may be reduced and the ratio increased by transferring the current to the terminal 16 at any desired point in the cycle. While valves of the vapor electric type are particularly suitable for use in connection with my improved power transfer system, it is to be understood that valves of any of the several types well known in the art may be used without departing from my invention.

It will also be obvious to those skilled in the art that my invention is equally applicable to systems in which both the supply and load circuits are alternating current circuits, in which case, each point of the multi-potential system will be connected to the other circuit through a pair of electric valves reversely connected in parallel, a connection well known in the art for transmitting energy between alternating current circuits.

What I claim as new and desire to secure by Letters Patent of the United States is:

1. The combination of an alternating current supply circuit, a direct current load circuit, a vapor electric device interconnecting said circuits and provided with a plurality of anodes and control electrodes each associated with a different one of said anodes, said anodes being arranged in groups, means associated with said circuit to impress a voltage on each of said groups, said control electrodes being arranged in groups corresponding to said anode groups, and means for impressing a voltage on said control electrodes and for shifting independently the voltage phase of each control electrode group with respect to the voltage impressed on the corresponding anode group to control the voltage of said load circuit.

2. The combination of alternating and direct current circuits, a transformer in operative relation with said alternating current circuit comprising a plurality of phase windings, a vapor electric device provided with a plurality of anodes and of control electrodes each associated with a different one of said anodes, said anodes and said control electrodes being arranged in corresponding groups, said groups of anodes being connected respectively to points of different voltage on said phase windings, and means for impressing a voltage on said control electrodes and for shifting independently the voltage phase of the control electrodes comprised in each group thereof with respect to the corresponding anode voltage, to vary the voltage of said direct current circuit.

3. In a system for transferring power between direct and alternating current circuits, a vapor electric device provided with a plurality of anodes and of control electrodes each associated with a different one of said anodes, said anodes and control electrodes being arranged in groups, means to impress different voltages on said groups of anodes, and means for impressing a voltage on said control electrodes and for shifting independently the voltage phase of each control electrode group with respect to the voltage impressed on the corresponding anodes to control the relative voltages of said circuits.

4. In a system for transferring power between direct and alternating current circuits, a vapor electric device provided with a plurality of anodes and of control electrodes each associated with a different one of said anodes, said anodes being arranged in groups associated with corresponding groups of said control electrodes, a transformer comprising a plurality of phase windings, one of said anode groups being connected to low voltage points on said windings, a second of said anode groups being connected to higher voltage points thereon, and means for impressing a voltage on each group of said control electrodes and for shifting independently the voltage phase of each control electrode group with respect to the voltage impressed on the corresponding anode group.

5. In a system for transferring power between direct and alternating current circuits, a vapor electric device comprising two groups of anodes and two corresponding groups of control electrodes associated therewith, a transformer comprising a plurality of phase windings, means to connect said groups of anodes respectively to points of said windings of different potential, each group of control electrodes being separately provided with means for impressing a voltage thereon and for shifting the phase of said voltage with respect to the voltage impressed on the corresponding anode group to vary the relative voltages of said circuits.

6. The combination of an alternating and a direct current circuit, a transformer in operative relation with said alternating current circuit comprising a plurality of phase windings, a vapor electric device comprising two groups of anodes and two corresponding groups of control electrodes associated therewith, means to connect said groups of anodes respectively to points of said windings of different potential, and means in operative relation with said alternating current circuit for impressing a voltage on said control electrodes and operable to shift the phase of said voltage of each control electrode group independently with respect to the voltage impressed on the corresponding anode group, to vary the voltage of said direct current circuit.

7. In combination, a supply circuit, a load circuit, one of said circuits being an alternating current circuit provided with a plurality of points of different potential, means including a plurality of electric valves for transmitting energy between said circuits, and means for distributing the current between said valves to obtain any desired ratio of the potential of said multi-potential circuit to that of said other circuit intermediate the minimum ratios obtainable by transferring energy through adjacent points of said alternating current circuit.

8. In combination, a plurality of electric valves, a supply circuit, a load circuit, one of said circuits being an alternating current circuit provided with a plurality of points of different potential, the other circuit being connected to said points of different potential through said valves, and means for distributing the current between said valves to obtain any desired ratio of the potential of said multipotential circuit to that of said other circuit intermediate the minimum ratios obtainable by transferring energy through adjacent points of said alternating current circuit.

9. In combination, a supply circuit, a load circuit, one of said circuits being an alternating current circuit provided with a plurality of points of different potential, means for transmitting energy between said circuits including an electric valve associated with each of two of said points of different potential, and means for distributing the current between said valves to obtain any desired ratio of the potentials of said circuits intermediate those obtaining when each of the two valves is singly fully conductive.

10. In a system of distribution, the combination of a supply circuit, a load circuit, one of said circuits being an alternating current circuit, means for transmitting energy therebetween including an inductive winding provided with an intermediate potential tap and a plurality of electric valves, and means for distributing the current between said valves to obtain any desired ratio of the potential of said alternating current circuit to that of said other circuit intermediate the minimum ratios obtainable by transferring energy through adjacent points of said alternating current circuit.

11. In combination, an alternating current supply circuit provided with a plurality of points of different potential, a plurality of electric valves, an electric translating circuit energized from said supply circuit through said valves, and means for distributing the current between said valves to energize said translating circuit at any desired potential intermediate the potentials of adjacent points of said supply circuit.

12. In combination, an alternating current supply circuit provided with a plurality of points of different potential, a plurality of electric valves, a direct current load circuit energized from said supply circuit through said valves, and means for distributing the current between said valves to energize said load circuit at any desired potential intermediate the potential of adjacent points of said supply circuit.

13. In combination, an alternating current load circuit provided with a plurality of points of different electrical potential, a plurality of electric valves, a direct current supply circuit connected to energize said load circuit through said valves, and means for distributing the current between said valves to obtain any desired ratio of the potential of said alternating current circuit to that of said supply circuit intermediate the minimum ratios obtaining when energy is transferred through adjacent points of said alternating current circuit.

14. In a system of distribution, the combination of a supply circuit, a load circuit, one of said circuits being an alternating current circuit provided with a plurality of points of different potential, means including a plurality of electric valves for transmitting energy between said circuits, and means for controlling the relative potentials of said circuits comprising means for independently controlling the conductivity of said valves.

15. In a system of distribution, the combination of a supply circuit, a load circuit, one of said circuits being an alternating current circuit provided with a plurality of points of different potential, means for transmitting energy therebetween including a plurality of electric valves each provided with an anode, a cathode, and a control electrode, and means for controlling the relative potentials of said circuits comprising means for independently shifting the phase of the control electrode potentials with respect to the anode potentials of said valves.

16. In a system of distribution, the combination of a supply circuit, a load circuit, one of said circuits being an alternating current circuit provided with a plurality of points of different potential, means including a plurality of electric valves for transmitting energy between said circuits, and means for controlling the relative potentials of said circuits comprising means for transferring the current from a point of lower potential to one of higher potential at any desired point in the cycle of alternating current.

17. In combination, a supply circuit, a load circuit, one of said circuits being an alternating current circuit provided with a plurality of points of different potential, means for transmitting energy between said circuits including an electric valve associated with each of two of said points of different potential, and means for transferring the load current between said valves at any point in the cycle of alternating current.

18. In combination, a supply circuit, a load circuit, one of said circuits being an alternating current circuit provided with a plurality of points of different potential, means for transmitting energy between said circuits including an electric valve associated with each of two of said points of different potential, and means for transferring the load current from a point of lower potential to one of higher potential at any desired point in the cycle of alternating current.

19. In combination, a supply circuit, a load circuit, one of said circuits being an alternating current circuit provided with a plurality of points of different potential, means for transmitting energy between said circuits including an electric valve associated with each of two of said points of different potential, and means for controlling the relative potentials of said circuits comprising means for maintaining conductive a valve associated with a point of lower potential and for rendering conductive a valve associated with a point of higher potential at any desired point in the cycle of alternating current.

20. In combination, a supply circuit, a load circuit, one of said circuits being an alternating current circuit provided with a plurality of points of different potential, means for transmitting energy between said circuits including an electric valve, provided with an anode, a cathode and a control electrode, associated with each of two of said points of different potential, and means for controlling the relative potentials of said circuits comprising means for exciting the control electrode of a valve associated with a point of lower potential to maintain said valve conductive whenever its anode potential is positive, and means for exciting the control electrode of a valve associated with a point of higher potential to render said valve conductive at any desired point in the cycle of alternating current.

21. In combination, a supply circuit, a load circuit, one of said circuits being an alternating current circuit provided with a plurality of points of different potential, means for transmitting energy between said circuits including an electric valve, provided with an anode, a cathode and a control electrode, associated with each of two of said points of different potential, and means for controlling the relative potentials of said circuits comprising means for impressing upon the control electrodes of said valves alternating potentials independently variable in phase.

22. The method of controlling the relative potentials of two circuits, one of said circuits being an alternating current circuit provided with a plurality of points of different potential and connected to the other circuit through a plurality of electric valves, which comprises maintaining certain of said valves conductive and controlling the conductivity of other of said valves.

23. The method of controlling the relative potentials, of two circuits, one of said circuits being an alternating current circuit provided with a plurality of points of different potential and connected to the other circuit through a plurality of electric valves provided with control electrodes, which comprises exciting the control electrode of a valve associated with a point of lower potential to maintain said valve conductive and impressing upon the control electrode of a valve associated with a point of higher potential an alternating potential variable in phase.

24. The method of controlling the relative potentials of two circuits, one of said circuits being an alternating current circuit provided with a plurality of points of different potential and connected to the other circuit through a plurality of electric valves each provided with an anode, a cathode, and a control electrode which comprises impressing upon the control electrode of a valve associated with a point of lower potential an alternating potential in phase with respect to its anode potential, and impressing upon the control electrode of a valve associated with a point of higher potential an alternating potential variable in phase with respect to its anode potential.

25. The method of controlling the relative potentials of two circuits, one of said circuits being an alternating current circuit provided with a plurality of points of different potential and connected to the other circuit through a plurality of electric valves, which comprises varying the conductivity of a valve associated with a point of lower potential and simultaneously maintaining said other valves nonconducting to obtain a predetermined range in the ratio of the potentials of said circuits, and maintaining said valve fully conductive and varying the conductivity of a valve associated with a point of higher potential to obtain another range in said ratio.

26. The method of controlling the relative potentials of two circuits, one of said circuits being an alternating current circuit provided with a plurality of points of different potential and connected to the other circuit through a plurality of electric valves each provided with an anode, a cathode, and a control electrode, which comprises impressing upon the control electrode of a valve associated with a point of lower potential an alternating potential variable in phase with respect to its anode potential and simultaneously exciting the control electrodes of the other valves to maintain them non-conductive for obtaining a predetermined range in the ratio of the potentials of said circuits, and exciting the control electrode of said valve to maintain it conductive and simultaneously impressing upon the control electrode of a valve associated with a point of higher potential an alternating potential variable in phase with respect to its anode potential for obtaining another range in said ratio.

27. In combination, an alternating current supply circuit, a translation circuit including a plurality of electric valves independently interconnecting said circuits, and means for maintaining constant the conductivity of certain of said valves and simultaneously and gradually varying the conductivity of other of said valves.

28. In combination, a supply circuit, a load circuit, one of said circuits being an alternating current circuit provided with a plurality of electrically spaced terminals, a plurality of electric valves interconnecting said circuits through said several terminals, and means for selectively controlling the conductivities of said valves to vary the voltage ratio of said circuits.

29. In combination, a supply circuit, a load circuit, one of said circuits being an alternating current circuit and including an inductive winding provided with a plurality of electrically spaced terminals, a plurality of electric valves interconnecting said circuits through the several terminals of said winding, and means for independently controlling the conductivities of said valves to transmit energy selectively through any of said terminals.

In witness whereof, I have hereunto set my hand this 25th day of September, 1930.

DAVID C. PRINCE.